US008543480B2

(12) United States Patent  (10) Patent No.: US 8,543,480 B2
Mueller et al.  (45) Date of Patent: Sep. 24, 2013

(54) LOGISTICS-EXPOSURE MANAGEMENT INTEGRATION FOR COMMODITY PRICE RISKS

(75) Inventors: Klaus Mueller, Neustadt (DE); Eric Bahembera Karambizi, Ketsch (DE); Thomas Fritzsche, Schwetzingen (DE); Stephan Heinz, Heddesheim (DE); Harald Schlueter, Walldorf (DE); Michael Goll, Heidelberg (DE); Christof Rausse, Heidelberg (DE); Detlef Noack, Hoyerswerda (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/222,572

(22) Filed: Aug. 31, 2011

(65) Prior Publication Data

US 2013/0054437 A1   Feb. 28, 2013

(51) Int. Cl.
 *G06Q 40/00*   (2012.01)
(52) U.S. Cl.
 USPC .............................. 705/36 R; 705/35; 705/37

(58) Field of Classification Search
 USPC ............................................ 705/37, 35, 36 R
 See application file for complete search history.

(56) References Cited

U.S. PATENT DOCUMENTS

| 7,805,353 | B2* | 9/2010 | Woodley | 705/37 |
| 8,335,729 | B2* | 12/2012 | Kulkarni et al. | 705/28 |
| 2006/0224492 | A1* | 10/2006 | Pinkava | 705/37 |
| 2009/0228898 | A1* | 9/2009 | Aveyard et al. | 719/314 |
| 2009/0313175 | A1* | 12/2009 | Mueller et al. | 705/36 R |

* cited by examiner

Primary Examiner — James A Vezeris
(74) Attorney, Agent, or Firm — Kenyon & Kenyon LLP (57) ABSTRACT

A message may be used to update computing system of a commodity transaction. The message may include a commodity identifier, a date term, a quantity term, and a price term. The price term may include a formula arrangement or reference to a formula arrangement for calculating a fractional exposure of the entity to the commodity on each date in which an event affecting commodity transaction occurs. Each of these fractional exposures may be calculated for each commodity transaction and stored as separate entries in a data structure. The entries may then be updated, queried, and/or reorganized to generate an exposure position.

20 Claims, 5 Drawing Sheets

LOGISTICS-EXPOSURE MANAGEMENT INTEGRATION FOR COMMODITY PRICE RISKS

BACKGROUND

Many organizations rely on computing systems, such as enterprise resource planning systems, to manage risk. Different accounting and legal requirements may require organizations to keep track of and account for an organization's financial exposure to various risks, including, for example, foreign exchange rate risks, credit risks, interest risks, and commodity price risks. For example, in the metals, mining, and oil industries different pricing formulas may be used to determine the price of delivered goods. These pricing formulas may, for example, average the price of a commodity at a futures exchange over a predetermined time period to calculate a final price of the delivered commodity.

While existing exposure management computing systems were able to calculate an organization's exposure to commodities on a fixed price basis, it was difficult and cumbersome to configure these systems to efficiently account for variable or floating price exposures as they may occur in sales and purchase orders, and then adjust the exposures as circumstances change, such as when commodities are ordered versus shipped versus delivered versus paid for. Additionally, existing exposure management systems lacked an intuitive methodology to analyze exposure information at an atomic level and then restructure the atomic level exposures into aggregated exposure positions needed to satisfy different hedging, accounting, and/or legal requirements. The lack of such an intuitive methodology has made it difficult for organizations to efficiently restructure price exposures into exposure positions.

There is a need for an intuitive methodology in systems and processes that may enable organizations to quickly and efficiently calculate an initial exposure and then later adjust exposure positions as circumstances change, while also enabling an intuitive and efficient restructuring of price exposures into exposure positions satisfying specific operative needs, such as the need to minimize losses due to high market volatility or to satisfy hedging, accounting, or legal requirements.

DETAILED DESCRIPTION

In an embodiment, a service oriented architecture (SOA) may be used to send SOA messages between different systems, such as treasury, accounting, logistics, sales, and others in an enterprise resource planning (ERP) system. These messages may include a commodity identifier, an identifier of an action being taken with respect to the commodity, a date of the action, and a price term. The price term may include a currency identifier and a formula for calculating a price of the commodity, such as average of commodity prices on a specified commodity exchange over a specified number days around a specified date.

These messages may be processed and the pricing formula may be parsed to create at least one sub raw exposure line item for each commodity price exposure within a specified time period. Each sub raw exposure line item may represent an "atom" of risk at a finest granularity. For example, in a price exposure example, if a final price is based on an average price over a five day period, then there may be five risk "atoms" or sub raw exposure line items, each including a daily price on each of the five days in the five day period. Other embodiments may specify different atomic levels, for example, quarters, months, or weeks, instead of days.

If the currency specified in a message differs from a default currency, such as a risk free currency, a corresponding currency exposure line item may also be created for corresponding raw exposure line items. The currency exposure amount in the currency exposure line item may be calculated differently in various embodiments. For example, in fixed price line items, the currency exposure amount may be calculated directly from the fixed price specified in the line item. Currency exposure amounts in floating price line items may be estimated from commodity forward price curves or actual spot prices, and may be periodically recalculated at fixed intervals or in response to certain events, such as a sudden change in spot prices.

Once the messages have been parsed and the appropriate line items have been created, the line items may be regrouped to calculate different exposure positions. For example, monthly price exposure positions may also be calculated for different commodities. Price exposure positions may also be calculated based on other criteria, such as the action being taken with respect to the commodity. For example, exposure positions may be grouped by forecasted orders, firm commitment orders, delivered orders, commodities awaiting delivery, commodity type, and so on. The exposure positions may then be reported or included as a part of a report.

Figure 1:
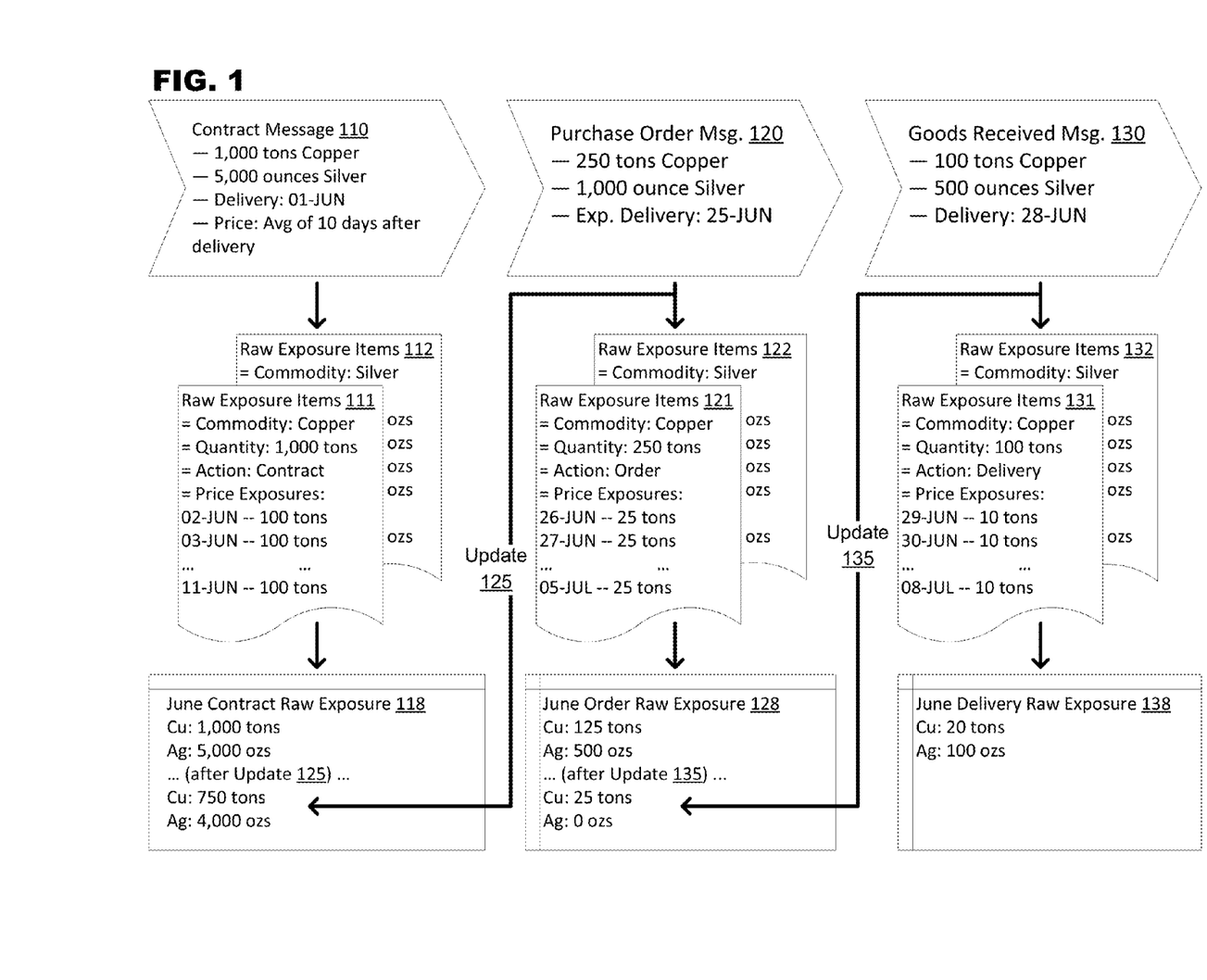
FIG. 1 shows an example of how commercial documents including a commodities transaction may be used to update exposure positions in an embodiment of the invention.

FIG. 1 shows an example of how contracts, purchase orders, and other types of commercial documents or status reports may be used to update raw exposures in an embodiment. The contents of commercial documents, such as contracts, purchase orders, bills of lading, and so forth, may be embedded in messages, such as SOA messages, and then transmitted between different application systems in an ERP system. For example, the agreed terms of contracts may be included in one or more contract messages 110.

In a contract for the exchange of goods, the contract message 110 may include an identifier of the goods exchanged, a quantity of goods, a price of the goods, a delivery date, and other agreed upon terms between the parties. A good may, but need not, be identical to a commodity in different embodiments. For example, wheat may be both a good that is exchanged and a commodity listed on a commodity exchange. Other agricultural goods, such as rye may also be exchanged. While rye is not typically classified as a commodity, the price of rye may be linked to the price of wheat. Ores in the mining industry, such as, for example, copper ore, may include several different commodities, such as copper, silver, and gold. Some embodiments may include data fields or data objects though which a mapping may be formed between particular goods and commodities. The mapping may, for example, be used to calculate a commodity price exposure associated with the particular goods specified in the contract message.

This data may be extracted from the contract and included in corresponding data fields within the message. In the case of an options contract to purchase up to 1,000 tons of copper and 5,000 ounces of silver for delivery on or after June 1, at a price equal to the average price of the goods over the ten days following the date of delivery, the contracts message 110 may include data fields for the 1,000 tons of copper, the 5,000 ounces of silver, the delivery date of June 1, and the price calculated as the average price of the 10 days following delivery.

In those instances where a pricing formula is used to calculate the price, such as with respect to the above contract, the terms of the pricing formula may be stored in a separate data structure instead of in the message. The price field in the message may then include a cross-reference to the data structure in order to correlate the proper pricing formula to the message.

The contract message 110 may originate from a logistics system, where the contract data included in the message may be inputted, received, extracted, or parsed to generate the message. The logistics system may send the contract message to one or more other application systems in the ERP system or the logistics system may broadcast the message for interested parties. The logistics system may also parse or otherwise process the data in the message to create one or more raw exposure items 111 and 112 for each commodity specified in the message 110 and may send the raw exposure items to the exposure management system. In this case, two raw exposure items 111 and 112 may be created; one for the 1,000 tons of copper and one for the 5,000 ounces of silver.

Each raw exposure item 111 and 112 may include one or more data fields identifying the commodity, a quantity term(s), a price term(s), a due date(s) such as a payment date(s) and/or a delivery date(s), and an action(s) to be taken. Each of these fields may contain data specific enough to identify a particular exposure associated with each contract term. For example, if the price is based on an average price of the commodity over a specific period, then the raw exposure items may include several price term exposure entries reflecting a net exposure on each day included in the period. Thus, in the case of contact message 110, the raw exposure items 111 may include a price exposure term for each of the ten days (June 2 to June 11) after the June 1 delivery date on which the price is to be calculated. Since the price in this case is based on an average price over the ten days, the quantity may be evenly apportioned between the ten days with 100 of the 1,000 tons ($1/10^{th}$) assigned to each of the ten days thereby creating ten separate sub raw exposure entries. The same process may be repeated when creating the raw exposure item 112 with respect to the contracted 5,000 ounces of silver.

Other commercial documents may include different terms. For example, the delivery dates may be based on a delivery formula instead of or in addition to the price formula. This may occur, for example, if delivery is made in period installments instead of on a single occasion. In this situation, the logistics and/or exposure management system may apply the delivery formula to calculate an exposure term for each commodity on each delivery date based on the delivery formula and also the price formula, if necessary. Each exposure term may then be included in the corresponding raw exposure item. The systems may be configured to calculate and include the necessary exposure terms in each raw exposure item.

Once the raw exposure items and its corresponding sub raw exposure items, or atoms of risk, are complete, mapping rules may be enforced to map selected exposure terms in the raw exposure items to a particular raw exposure position. In the example shown in FIG. 1, the mapping rules may specify that any contractual commodity exposure occurring in June be included in the June Contract Raw Exposure 118. As a result, each of the ten price exposure terms in raw exposure items 111 and 112, mainly the price of the 100 tons of copper and 500 ounces of silver, respectively, on each day between June 2 and June 11, may be included in the June Contract Raw Exposure 118. The Raw Exposure 118 may thus reflect a total contractual exposure of 1,000 tons of copper and 5,000 ounces of silver in June.

Some time later, the organization may place a purchase order to exercise part of its option to purchase up to 1,000 tons of copper and 5,000 ounces of silver. As part of this purchase order, the organization may elect to purchase 250 tons of copper and 1,000 ounces of silver with an expected delivery date of June 25, under the original price term included in the option contract. Once the purchase order has been generated, approved, transmitted, or otherwise processed, the relevant terms included in the purchase order may be inputted, extracted, parsed, or otherwise included in a purchase order message 120 at a logistics system. These relevant terms may include an identifier of a prior commercial document to which the current document relates. In this case purchase order message 120 may include an identifier of the contract cited in contract message 110.

The logistics system may send the purchase order message 120 to one or more other application systems in the ERP system or the logistics system may broadcast the message. An exposure management system may receive the message and extract, parse, or otherwise process the data in the message to create one or more raw exposure items 121 and 122 for each commodity specified in the message 120. Alternatively, the logistics system may perform this step before transmitting the information to the exposure management system. In the above mentioned example, two raw exposure items 121 and 122 may be created; one for the 250 tons of copper ordered and one for the 1,000 ounces of silver ordered. An update message may also be generated and/or sent to update the June contract raw exposure 118 based on the additional information in the purchase order message 120

Each raw exposure item 121 and 122 may include one or more data fields identifying the commodity, a quantity term(s), a price term(s), a due date(s), and/or an action(s) to be taken. In this case, since the price terms remain unchanged from the original terms in the contract, the field in the purchase order cross referencing the original contract may be used to obtain the pricing terms and/or pricing formulas with the original contract as included, for example, in contract message 110.

Thus, referring to the pricing terms cited in contact message 110, the raw exposure items 121 and 122 may include a price exposure term for each of the ten days (June 26 to July 5) after the June 25 delivery date for which the price is to be calculated. Since the price in this case is based on an average price over the ten days, the quantity goods ordered may be evenly apportioned between each of the ten days with 25 out of the 250 tons ($1/10^{th}$) of ordered copper assigned to each of the ten days. The same process may be repeated when creating the raw exposure item 122 terms with respect to the ordered 1,000 ounces of silver.

Once the raw exposure items and terms are complete, mapping rules may be enforced to map selected exposure terms in the raw exposure items to a particular raw exposure. In the example shown in FIG. 1, the mapping rules may specify that any contractual commodity exposure occurring in June be included in the June Contract Raw Exposure 118 and they may also specify that any ordered commodity exposure occurring in June be included in the June Order Raw Exposure 128.

Applying these mapping rules to the price exposure terms in raw exposure items 121 and 122 may result in an updating 125 of the June Contract Raw Exposure 118 to reflect the purchase of 250 tons of copper and 1,000 ounces of silver. Since 250 out of the 1,000 tons of copper and 1,000 out of the 5,000 ounces of silver available to purchase have been ordered, the options contract exposure to copper and silver should be respectively reduced by 250 tons and 1,000 ounces. The mapping rules may be used to automatically update previously calculated exposure positions as well as to automatically calculate new exposure positions.

Applying these mapping rules may also result in each of the qualifying ten price exposure terms in raw exposure items 121 and 122, mainly the price of the 250 tons of copper and 1,000 ounces of silver, respectively, on each day in June between June 26 and July 5, to be included in the June Order Raw Exposure 128. As a result, the June Order Raw Exposure 128 may reflect a total order exposure of 125 tons of copper (25 tons each day between June 26 and June 30) and 500 ounces of silver (100 ounces each day between June 26 and June 30) in June.

On June 28, the organization may receive delivery of 100 tons of copper and 500 ounces of silver. Once the document or action confirming delivery has been received, approved, transmitted, or otherwise processed, the relevant terms included in the delivery document may be inputted, extracted, parsed, or otherwise included in a good received message 130 at a logistics system. These relevant terms may include an identifier of a prior commercial document to which the current document relates. In this case good received message 130 may include an identifier citing the purchase order referred to in purchase order message 120 and/or an identifier citing the contract referred to in contract message 110. Another update 135 message may also be generated and/or sent to update the June order raw exposure 128 based on the delivery.

The logistics system may send the goods received message 130 to one or more other application systems in the ERP system or the logistics system may broadcast the message. An exposure management system may receive the message and extract, parse, or otherwise process the data in the message to create one or more raw exposure items 131 and 132 for each commodity specified in the message 130. Alternatively, the logistics system may perform this step before transmitting the information to the exposure management system. In the above example, two raw exposure items 131 and 132 may be created; one for the 100 tons of copper delivered and one for the 500 ounces of silver delivered.

Each raw exposure item 131 and 132 may include one or more data fields identifying the commodity, a quantity term(s), a price term(s), a due date(s), and/or an action(s) to be taken. In this case, since the price terms remain unchanged from the original terms in the contract, the price field(s) in the original contract may be used to obtain the pricing terms and/or pricing formulas.

Thus, referring to the pricing terms cited in contact message 110, the raw exposure items 131 and 132 may include a price exposure term for each of the ten days (June 29 to July 8) after the June 28 delivery date for which the price is to be calculated. Since the price in this case is based on an average price over the ten days, the quantity of goods delivered may be evenly apportioned between each of the ten days with 10 out of the 100 tons ($1/10^{th}$) of delivered copper assigned to each of the ten days. The same process may be repeated when creating the raw exposure item 132 terms with respect to the delivered 500 ounces of silver.

Once the raw exposure items and terms are complete, mapping rules may be enforced to map selected exposure terms in the raw exposure items to a particular raw exposure and/or exposure position. In the example shown in FIG. 1, the mapping rules may specify that any ordered commodity exposure occurring in June be included in the June Order Raw Exposure 128 and they may also specify that any commodity delivery occurring in June be included in the June Delivery Raw Exposure 138.

Applying these mapping rules to the price exposure terms in raw exposure items 131 and 132 may result in an updating 135 of the June Contract Raw Exposure 128 to reflect the delivery of 100 tons of copper and 500 ounces of silver. Since 100 out of the 250 tons of copper ordered has been delivered, and 500 out of the 1,000 ounces of silver ordered has been delivered, the order exposure to copper and silver should be respectively reduced by 100 tons and 500 ounces. The mapping rules may be used to automatically update previously calculated exposures as well as to automatically calculate new exposures.

Applying these mapping rules may also result in each of the qualifying ten price exposure terms in raw exposure items 131 and 132, mainly the June price exposures of the 100 tons of copper and 500 ounces of silver, respectively, on June 29 and June 30, being included in the June Order Raw Exposure 128. As a result, the June Delivery Raw Exposure 138 may reflect a total order exposure of 20 tons of copper (10 tons each day between June 29 and June 30) and 100 ounces of silver (50 ounces each day between June 29 and June 30).

In sum, FIG. 1 shows how creating separate exposure terms, such as daily price exposure terms, for each commodity in raw exposure item records and then using mapping rules to map different exposure terms to different exposure positions enables the seamless creation and updating of customized raw exposures.

Figure 2:
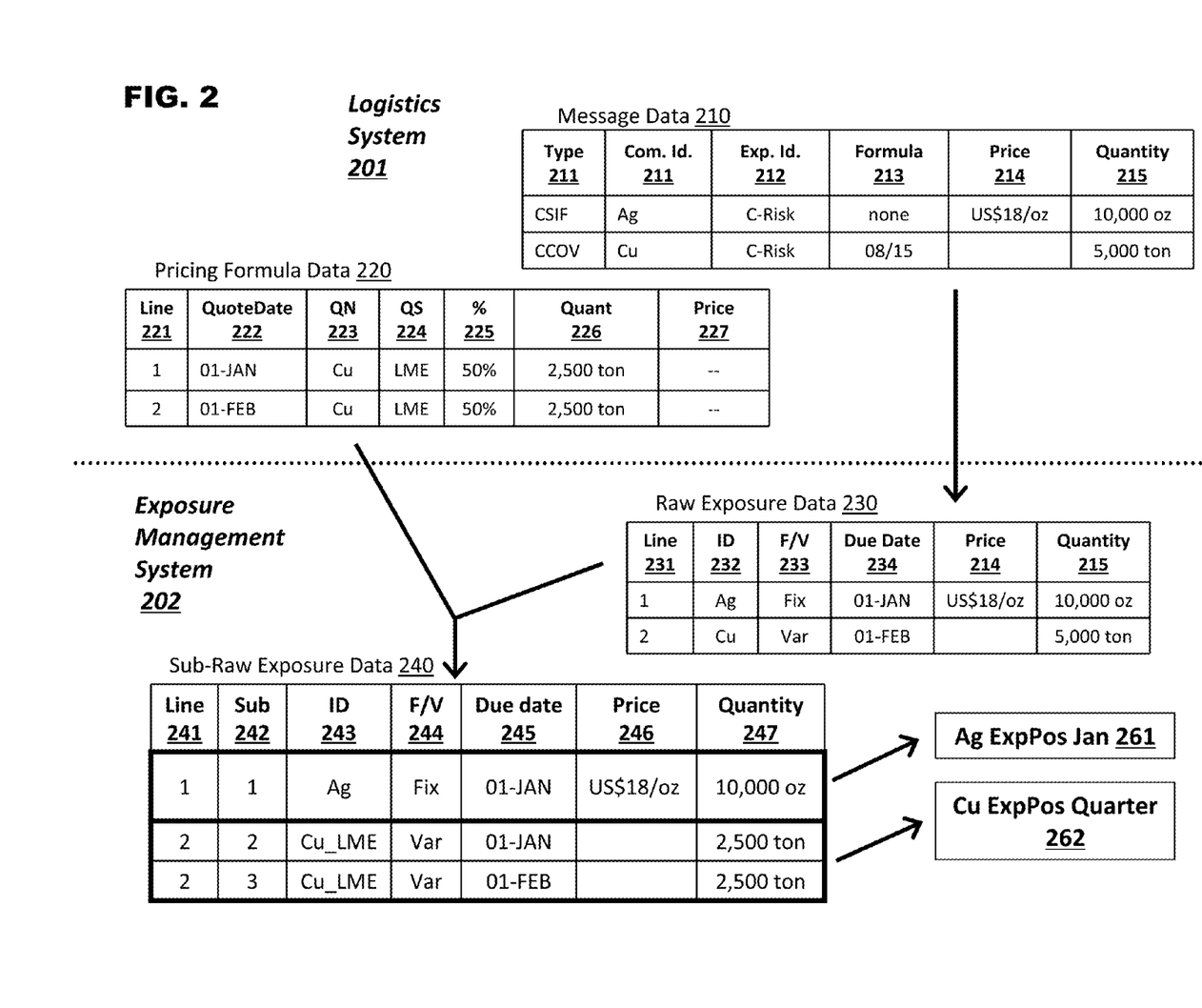
FIG. 2 shows how data may be transformed between systems in an embodiment of the invention.

FIG. 2 shows how data may be transformed between systems to enable the creation of customizable exposure positions and exposure position reports. Events representing different phases of commercial transactions, such as executing, sending, or receiving contracts, options, purchase orders, bills of lading, or other documents may be monitored by logistics system 201. During this monitoring, the logistics system 201 may send and receive messages, such as SOA messages, to other application systems. These messages may include event updates regarding the different phases of commercial transactions.

Each of these messages may include one or more message data fields 210. The data included in these fields may be obtained from a commercial document, another application and/or computing system, an incoming message, or another data source. The data may be extracted, parsed, copied, or otherwise transferred to the message data fields 210 in the logistics system. In some instances, the logistics system 210 may search messages, data sources, or documents to identify particular fields, such as fields 211 to 215 from which data is to be obtained. In other instances, the logistics system 210 may scan messages, data sources, or documents to identify additional fields that may be included as part of the message data fields 210.

Some exemplary message data fields 210 include fields 211 to 215. A message type field 211 may indicate the type of message or type of commercial document the message data represents. A commodity identifier field 211 may a identify of a commodity to which the rest of the data pertains. An exposure identifier field 212 may identify an exposure faced by the organization. Examples of exposures include but are not limited to a commodity price risk and a currency fluctuation risk. A formula field 213 may specify a formula used to calculate a commodity price. The formula field 213 may include a reference to a pricing formula data structure 220 which may include additional data as part of the pricing formula from which a commodity price may be calculated.

The price field 214 may include a fixed commodity price. The fixed price may be specified at the outset of a commodity transaction, in that the parties may initially agree to a particular fixed price when a commodities contract is commenced. The price field 214 may also be completed at a future date. For example, if an agreed commodity price is contingent on an exchange price at a future date, the price field 214 may be left blank until the exchange price on the future date is determined. At that time, the exchange price may be entered in the price field 214. In some instances, a blank price field 214 may indicate that the price is variable whereas a non-blank price field 214 may indicated that the commodity price is fixed.

Quantity field 215 may include a commodity quantity. In some instances, the quantity field 214 may also include units of measurement as shown. In other instances the unit of measurement may be implied based on one or more other fields or the units of measurement may be included as part of a separate field.

Message data fields 210 may also include a currency field (not shown). The currency field may specified the currency in which a commodity transaction is to occur. In some instances, the currency may included as part of the price field 214, the formula field 213, or the pricing formula data structure 220, though in other instances the currency may be included in other fields or as part of its own separate field. If the currency is different from a default currency, a currency exposure and/or currency exposure position may also be calculated.

The pricing formula data structure 220 may include one or more data fields 221 to 227 used to calculate a commodity price. For example, a line field 221 may identify particular rows of the pricing formula. The Quote Date 222 field may specify a date a commodity price is to take effect. The QN or Quote Name field 223 may be used to identify the commodity to a price quote source using an identifier recognized by the quote source. The QS or quote source field 224 may specify a source from which the price quote is to be obtained. The % or percent field 225 may specify a percent of a commodity order on which the price quoted on the quote date 222 from the quote source 224 is to be based. The quantity field 226 may specify a quantity of a commodity order on which the price quoted on the quote date 222 from the quote source 224 is to be based.

The price field 227 may be used to store the quote price from the quote source 224 for the commodity 223 on the quote date 222. In some instances, a price from the quote source 224 may be automatically entered in the price field 227 on or after the quote date 222. For example, the logistics system 201 or another system may retrieve the price quote from quote source 224 using the quote name 223 recognized by the quote source 224 on the quote date 222. Alternatively, the quote source may also send a message to the organization's systems, including, for example, the logistics system 201, on or after the quote date 222 that included the quote price 227 and the quote name 223. The logistics system may analyze the message and store the price included in the message in the price field 227.

The logistics system 201 may generate and/or send messages including data from the message data structure 210 and pricing formula data structure 220 to the exposure management system 202. The exposure management system 202 may process the messages, analyze the data, and restructure the data into a raw exposure data structure 230 and/or a sub-raw exposure data structure 240, from which exposure positions 261 and 262 may be generated. The sub-raw exposure data structure 240 may be used to store atomic level exposure information. Atomic level exposure information may include, for example, exposure information at a finest granularity. For example, in a price exposure example, if a final price is based on an average price over a five day period, then the atomic level exposure information may include the price on each of the days in the five day period, since this is the most detailed information and the finest level of granularity used to calculated the final price.

For example, the raw exposure data structure 230 may include a commodity identifier field 232. This may, but need not, be copied from the commodity ID field 211 and/or quote name field 223. The fixed/floating F/V field 223 may indicate whether a commodity price is fixed or floating. The F/V field 223 may indicate the price is fixed if each of the applicable price fields 213 and/or 227 in the corresponding data structures 210 and/or 220 include a price term. Otherwise, the F/V field 223 may indicate the price is variable or to be determined in the future. The due date field 234 may indicate a last delivery date, an order date, or some other date affective a commodity exposure.

The price field 235 may indicate a calculated price of the commodity. The price field 235 may include data from one or more of the price fields 214 and/or 227 included in the transmitted message. In the case where a pricing formula is specified, the price field 235 may include a resulting price calculated by applying the pricing formula. The quantity field 236 may include a quantity of commodity involved in a commodity transaction creating an exposure for the organization.

The data in the raw exposure data structure 230 may also be combined with data from the pricing formula data structure 220 included in messages sent to the exposure management system 202 to create a sub-raw exposure data structure 240. The sub-raw exposure data structure 240 may result in an itemization of commodity transactions by date or other event. The itemization may enable the data within the sub-raw exposure data structure 240 to be reorganized into user specified exposure positions.

In the example shown in FIG. 2, the contract for 5,000 tons of copper is based on an average price of copper on the London Metals Exchange (LME) on January 1 and February 1, whereas the contract for 10,000 ounces of silver is fixed at eighteen U.S. dollars per ounce. The data concerning the copper and silver transactions included in the raw exposure data structure 230 and the pricing formula data structure 220 may be combined so that each individual transaction resulting in an exposure is separately listed in the sub-raw exposure data structure 240. In this case, the transaction involving the 10,000 ounces of silver on January 1 for US$18/oz is shown on the first row of the sub-raw exposure data structure 240. Since the 5,000 ton copper transaction results in two separate price exposures, one on January 1 and the other on February 1, two separate entries, one for the exposure on January 1 and the other for the exposure on February 1 may be created and included in the sub-raw data structure 240.

The sub-raw data structure 240 may include different data fields. For example, a line field 241 may store a reference identifier to correspond the row in the sub-raw structure 240 to its parent in the raw exposure structure 230 or in the message structure 210. The line field 241 in this case includes a "1" for entries relating to the silver transaction and a "2" for entries relating to the copper transaction. The commodity identifier field 242 may identify the commodity involved in the transaction. The commodity identifier field 242 may be based on one or more or a combination of one or more of the commodity identifier fields 211, 232, 223, and/or 224. The fixed/floating F/V field 243 may indicate whether a price in the price field 246 is fixed or variable. The due date field 244 may indicate a date a transaction is planned to occur. The price field 245 may indicate the price of the commodity on the date in the date field 244. The quantity field 246 may indicate the quantity of the commodity identified in field 242 and involved in the transaction on the date in the date field 244.

A user specified or constructed query may then be executed on the data in the sub raw exposure data structure 240 to generate an exposure position. In the example shown in FIG. 2, queries grouping the due date field 245 by month may be run to generate monthly commodity exposure positions reports for silver and, separately, quarterly reports for copper. The January exposure position report for silver 261 may include data from the first row of the sub raw exposure data structure 240 pertaining to the 10,000 ounce silver transaction on January 1. The First Quarter exposure position report for copper 262 may include aggregated data from the second and third rows of the sub raw exposure data structure 240 pertaining to the 2,500 ton copper pricing transaction occurring on January 1 and the second 2,500 ton copper pricing transaction occurring on February 1.

Figure 3:
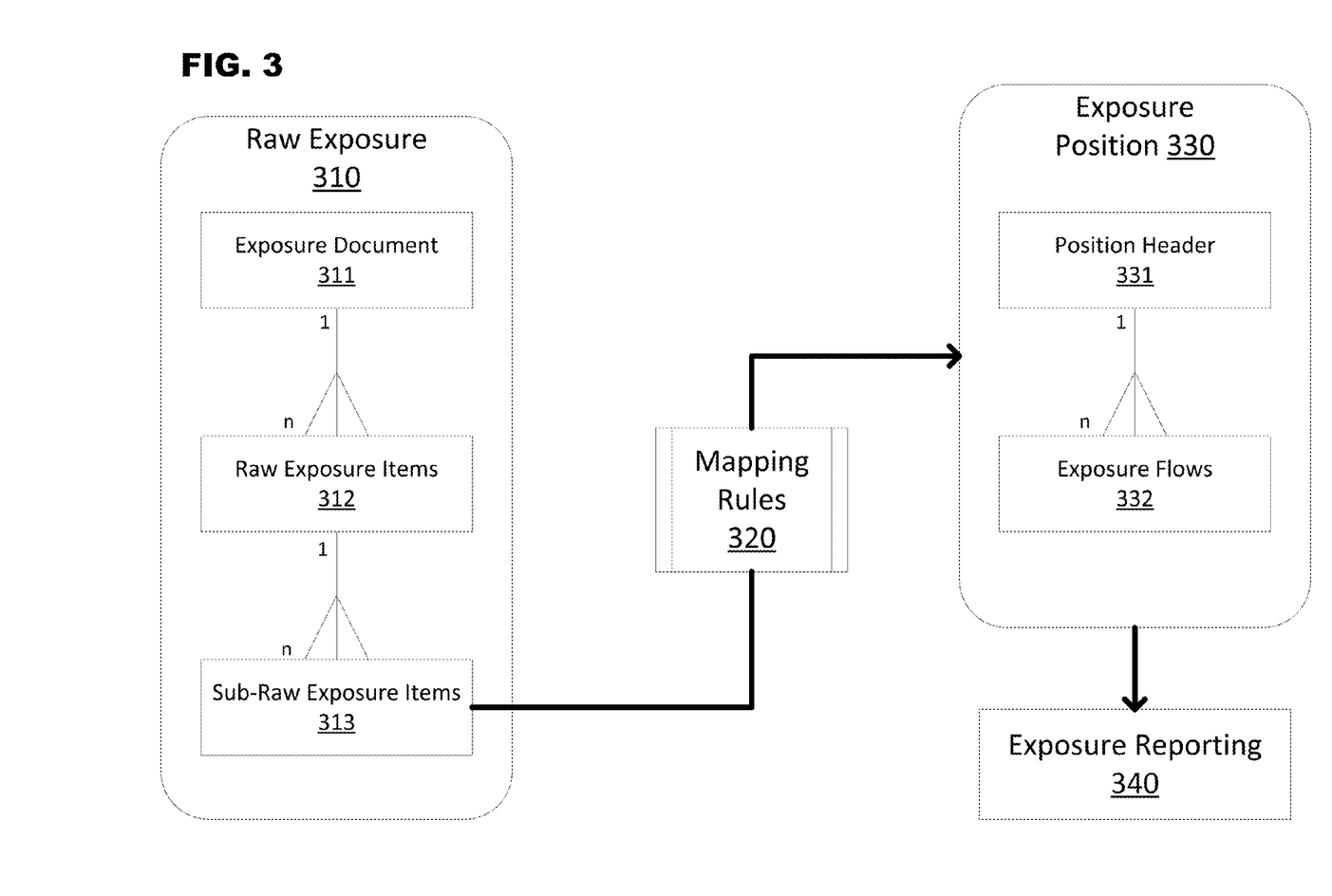
FIG. 3 provides an overview of how an exposure position may be created.

FIG. 3 provides a broad overview of how an exposure position 330 may be created from documents, records, and data sources 311 containing exposure information. Raw exposure information 310 may be included in one or more exposure documents 311. These exposure documents 311 may include contracts, purchase orders, receipts, bills of landing, and other records including data reflecting a commercial transaction involving one or more commodities.

Each exposure document 311 may include information about one or more commodity transactions. A raw exposure item record 312 may be created for each commodity transaction included in the exposure document 311. The raw exposure item records 312 may include data and data fields containing information relevant to the commodity transactions, such as the data fields shown in the raw exposure data structure 230.

One or more sub-raw exposure item records 313 may be created for each raw exposure item record 312. A separate sub-raw exposure item record 313 may be created for each distinct transactional event associated with a commodity transaction in a raw exposure item record 312. For example, if the price of a commodity of a transaction included in a raw exposure item record 312 is based on an average price of the commodity over a thirty day period, then a separate sub-raw exposure item record 313 corresponding to each atomic risk may be generated for each day in the thirty day period to account for the price exposure on each of thirty days. Similarly, if a price of the commodity is dependent on a delivery date and the delivery is subdivided and split between several dates, a separate sub-raw exposure item record 313 may be generated for each of the dates on which a partial delivery is scheduled to occur to account for the price exposure on each of the delivery dates.

Mapping rules 320 may be used to aggregate different sub-raw exposure records 313 generated from one or more different raw exposure items 312 and exposure documents 311 to a single exposure position 330. The mapping rules 320 may specify the criteria for an exposure position 330. For example, if an exposure position 330 setting forth the monthly exposure to certain commodities over a one year period is desired, the mapping rules 320 may specify the criteria of certain commodities, and/or may specify the year or monthly periods.

Each exposure position 330 may include a header 331, which may include information identifying the exposure position 330 and/or information identifying the fields included in the exposure flows 332. Each exposure position 330 may also include one or more exposure flows 332. Each exposure flow 332 may include data and changes to data from a corresponding sub-raw exposure item 313 mapped to the exposure position 330 by the mapping rules 320.

The data in header 331 and flows 322 of an exposure position 330 may then be sent to an exposure reporting system 340, where data may be reformatted, consolidated, or otherwise included in a report, analysis, or other finding.

Figure 4:
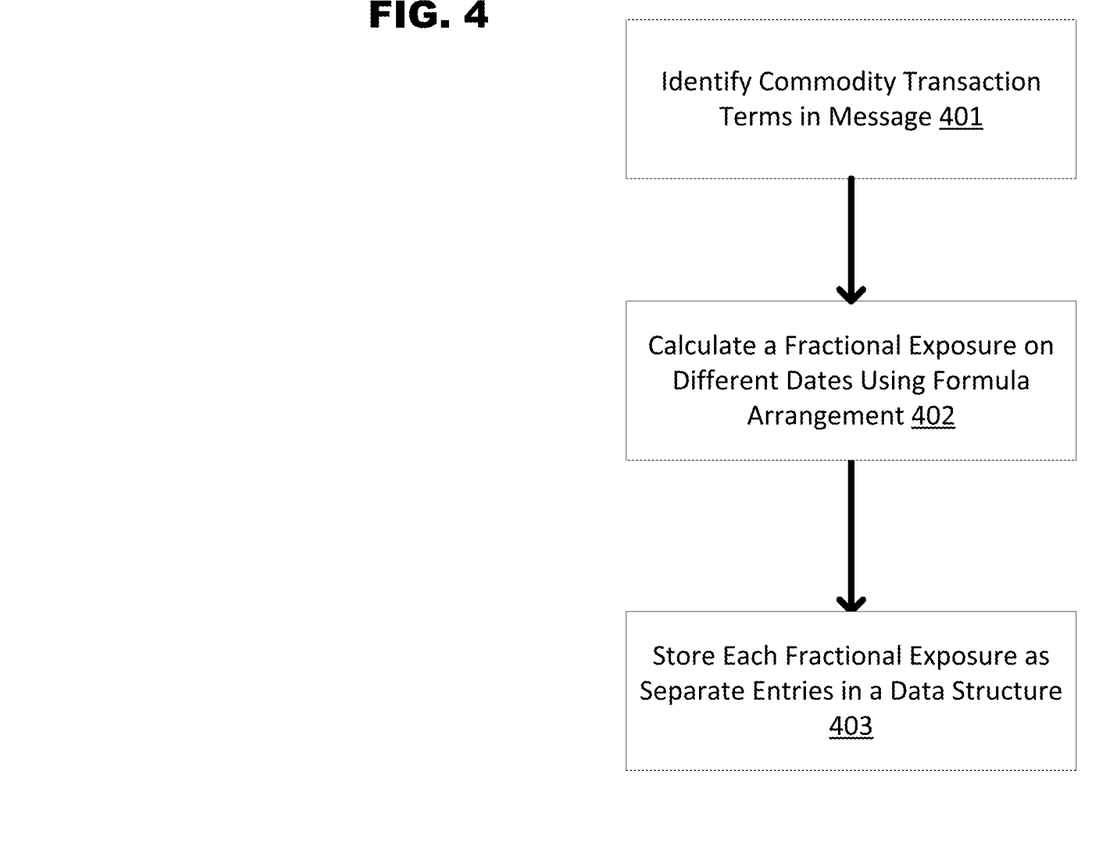
FIG. 4 shows an exemplary process in an embodiment of the invention.

FIG. 4 shows an exemplary process in an embodiment of the invention. In box 401, the terms of a commodity transaction, such as a date of the transaction, a price of the transaction, and a quantity of the commodity involved in the transaction, included in a message processed at an exposure management system may be identified. The identified terms may include a data relating to a formula arrangement for calculating a fractional exposure of the entity to the commodity on a plurality of dates on which events related to the commodity transaction may occur.

In box 402, the formula arrangement and the identified terms may be used to calculate the fractional exposure of the entity to the commodity on each of the dates on which events related to the commodity transaction may occur.

In box 403, the calculated fractional exposure for each of the dates may be stored in a data structure along with other identified terms of the contract, which may also include a fractional amount of at least one term. The fractional amount may correspond to the calculated fractional exposure, so that if, for example, the final price of the commodity is based on an average price over two dates, the entries in the data structure corresponding to the fractional exposure one the first of the two dates may also include one-half of the total quantity in the quantity term. Thus, a fractional one-half of the total quantity may be fractional amount of the quantity term that is included in the data structure.

Figure 5:
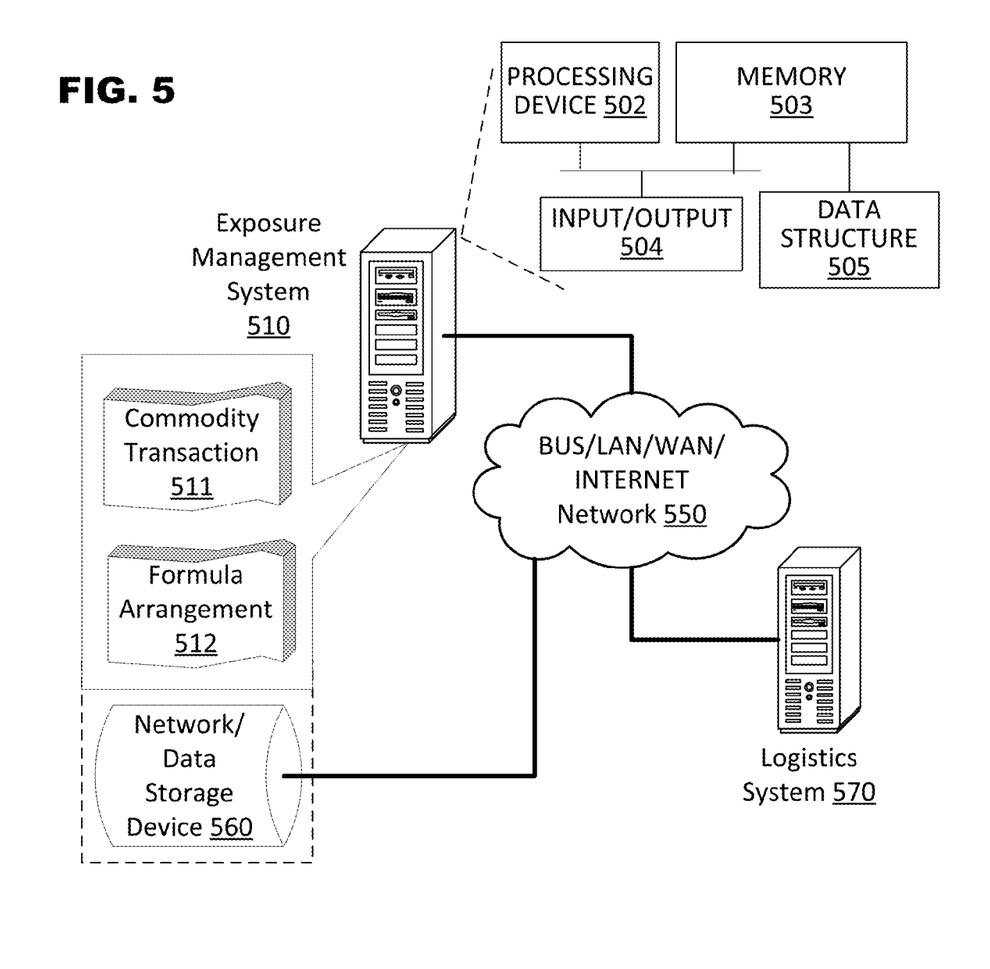
FIG. 5 shows an exemplary architecture in an embodiment of the invention.

FIG. 5 shows an exemplary architecture in an embodiment of the invention. Exposure management system 510 may analyze data relating to a commodity transaction 511 received though an electronic message over network 550 and may analyze and perform fractional exposure calculations on the commodity transaction data 511 according to formula arrangement 512. Exposure management system 510 may be connect to a network 550.

Network 550 may include a LAN, WAN, bus, or the Internet. Exposure management system 510 may interface with other systems and component depending on the application. For example, a network/data storage device 560 may be used to store the data structures previously mentioned. The storage device 560 may be a part of the ERP system 510. In some embodiments the network storage device 560 may also be separate from the ERP system 510 but connected to it through network 550. The storage device 560 may contain a hard disk drive, flash memory, or other computer readable media capable of storing data.

Logistics systems 570 and other external data sources may also be connected to network 550. Logistics system 570 may be used to identify a commodity transaction, identify a formula arrangement associated with the commodity transaction, generate messages including commodity transaction and/or formula arrangement data, and then send the generated messages to the exposure management system. Logistics system 570 may also generate and send updated messages reflecting changes to commodity transactions identified by the logistics system 570.

Each of the systems and devices in FIG. 5 may contain a processing device 502, memory 503 storing loaded data or a loaded data structure 505, and an communications device 504, all of which may be interconnected via a system bus. In various embodiments, each of the systems 510, 560, and 570 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software or hardware, but some systems and methods consistent with the present invention may be implemented in both software and hardware.

We claim:

1. A method comprising:
    receiving a service oriented architecture (SOA) message from a logistics system over a communication network containing a raw exposure item including an identifier of a good, a quantity term, a price term, and a delivery term obtained from an electronic commercial document pertaining to an exchange of the good;
    identifying, using a processing device, a plurality of dates on which an event affecting the exchange of the good is to occur from at least one of the quantity term, the price term, and the delivery term;
    calculating a change in an exposure of an entity based on the occurrence of each event on each of the identified dates using the processing device;
    creating separate sub-raw exposure items for each of the identified dates including the calculated changed in the exposure on each respective date using the processing device;
    identifying those created sub-raw exposure items satisfying a mapping rule, the mapping rule specifying criteria for transferring data from the sub-raw exposure items to at least one exposure position;
    aggregating the identified sub-raw exposure items into the at least one exposure position; and
    reporting the at least one exposure position.

2. The method of claim 1, wherein the plurality of dates are obtained from at least one of a multi-date pricing formula associated with the price term and a multi-date delivery associated with the delivery term that affects the exposure of the entity.

3. The method of claim 1, further comprising creating a separate currency sub-raw exposure items for each date on which an event affecting an exposure of an entity occurs that involves a foreign currency necessitating a currency conversion.

4. The method of claim 3, wherein the mapping rule specifies a currency as the criteria of the sub-raw exposure items and the aggregating the identified sub-raw exposure items into the exposure position identifies a currency exposure of the entity.

5. The method of claim 4, wherein a floating price currency exposure is calculated from a commodity forward price curve.

6. The method of claim 4, wherein the currency exposure is initially calculated based on a spot price and a floating price currency exposure is subsequently recalculated based on an updated spot price.

7. The method of claim 1, wherein the mapping rule includes a defined differentiation criterion to create a consolidated exposure position representing a subset of commodity transaction events affecting the entity.

8. The method of claim 1, wherein the mapping rule includes a commodity criterion to identify sub-raw exposure items pertaining to a same commodity.

9. The method of claim 1, wherein the mapping rule includes a date criterion to identify events in sub-raw exposure items occurring in a specified timeframe.

10. The method of claim 7, wherein the consolidated exposure position is reported to another financial system of the entity for use by the another financial system.

11. The method of claim 7, wherein the consolidated exposure position includes a subset of the data in the identified sub-raw exposure items.

12. The method of claim 11, further comprising storing a record of changes to the identified sub-raw exposure items in an exposure flow field associated with the consolidated exposure position.

13. The method of claim 12, wherein the consolidated exposure position includes a grouping of the data in the identified sub-raw exposure items.

14. The method of claim 13, wherein the consolidated exposure position includes a total representing a sum of numerical data in the grouping.

15. The method of claim 1, wherein the consolidated exposure position includes a position header identifying an exposure position and data associated with the exposure position.

16. The method of claim 1, wherein the consolidated exposure position includes a plurality of exposure flow records, each exposure flow record storing a change to a respective sub-raw exposure item.

17. A system comprising:

a processing device;

a communications device connected to a communications network;

a memory device;

a mapping arrangement; and an aggregating arrangement, wherein:

the communications device receives a service oriented architecture (SOA) message from a logistics system over the communication network containing a raw exposure item including an identifier of a good, a quantity term, a price term, and a delivery term obtained from an electronic commercial document pertaining to an exchange of the good;

the processing device (i) identifies a plurality of dates on which an event affecting the exchange of the good is to occur from at least one of the quantity term, the price term, and the delivery term, (ii) calculates a change in an exposure of an entity based on the occurrence of each event on each of the identified dates using the processing device, and (iii) creates separate sub-raw exposure items for each of the identified dates including the calculated changed in the exposure on each respective date using the processing device;

the memory device stores the created sub-raw exposure items;

the mapping arrangement identifies those created sub-raw exposure items satisfying a mapping rule, the mapping rule specifying criteria for transferring data from the sub-raw exposure items to at least one exposure position; and the aggregating arrangement aggregates the identified sub-raw exposure items into the at least one exposure position and reports the at least one exposure position.

18. A method comprising:

parsing, using a processing device, an electronic commercial document pertaining to an exchange of a good;

extracting from the parsing of the electronic commercial document an identifier of the good, a quantity term, a price term;

identifying, using said processing device, a plurality of dates on which an event affecting the exchange of the good is to occur from at least one of the quantity term, the price term, and the delivery term;

calculating a change in an exposure of an entity based on the occurrence of each event on each of the identified dates;

associating each of the identified dates and calculated exposure changes with atomic-level risks, the atomic-level risks being a discrete set of risks, which when aggregated, represent the exchange of the good specified in the electronic commercial document;

creating separate sub-raw exposure items for each of the identified atomic-level risks;

recording exposures associated with each of the identified atomic-level risks in its respectively created sub-raw exposure item;

identifying sub-raw exposure items satisfying a mapping rule, the mapping rule specifying criteria of the sub-raw exposure items transcending an individual transaction;

aggregating the identified sub-raw exposure items into a consolidated exposure position; and reporting the consolidated exposure position.

19. The method of claim 18, wherein the atomic-level risks include foreign exchange risks of each currency, and the sub-raw exposure items are created for each of the different currencies for each of plurality of transactions.

20. The method of claim 18, wherein the atomic-level risks represent a commodity price exposure during subsets of time within the time period for each transaction, and the sub-raw exposure items are created for each subset of time and each transaction.

* * * * *